(12) United States Patent
Yun

(10) Patent No.: US 6,741,236 B2
(45) Date of Patent: May 25, 2004

(54) INFORMING APPARATUS AND METHOD FOR EXCHANGE TIME OF EXPENDABLE SUPPLIES IN REFRIGERATOR

(75) Inventor: Keyong-Seok Yun, Changwon Gveongnam (KR)

(73) Assignee: LG Electronics Inc., Seoul (KR)

( * ) Notice: Subject to any disclaimer, the term of this patent is extended or adjusted under 35 U.S.C. 154(b) by 126 days.

(21) Appl. No.: 09/879,890

(22) Filed: Jun. 14, 2001

(65) Prior Publication Data

US 2001/0052896 A1 Dec. 20, 2001

(30) Foreign Application Priority Data

Jun. 19, 2000 (KR) ........................................ 2000-33706

(51) Int. Cl.⁷ ................................................ G09G 5/00
(52) U.S. Cl. ............................ 345/173; 62/125; 210/85
(58) Field of Search ................................ 345/173, 168, 345/169, 156; 62/125, 126, 127; 210/739, 85, 87

(56) References Cited

U.S. PATENT DOCUMENTS

| | | | | |
|---|---|---|---|---|
| 5,335,509 A | * | 8/1994 | Naamisniak et al. | .......... 62/125 |
| 5,814,212 A | * | 9/1998 | Hsu | ............................. 210/87 |
| 5,907,958 A | * | 6/1999 | Coates et al. | ................. 62/338 |
| 6,355,177 B2 | * | 3/2002 | Senner et al. | ............... 210/739 |
| 6,375,834 B1 | * | 4/2002 | Guess et al. | ................... 210/85 |
| 6,393,848 B2 | * | 5/2002 | Roh et al. | ...................... 62/126 |
| 6,453,687 B2 | * | 9/2002 | Sharood et al. | ............... 62/127 |
| 6,519,963 B2 | * | 2/2003 | Maeda | ....................... 62/259.2 |
| 2002/0101346 A1 | * | 8/2002 | Busick | ....................... 340/521 |

* cited by examiner

Primary Examiner—Xiao Wu
(74) Attorney, Agent, or Firm—Fleshner & Kim, LLP

(57) ABSTRACT

The present invention relates to an informing apparatus and method for exchange time of expendable supplies in a refrigerator. In the present invention, an exchange date of the expendable supplies is calculated on the basis of data on the exchange of the expendable supplies inputted by a user upon exchange of the expendable supplies, and indication of request for the exchange of the expendable supplies is displayed onto a screen 50 on the relevant date in accordance with the exchange date of the expendable supplies. According to the present invention, the expendable supplies can be replaced at more accurate exchange time, and the operation of the refrigerator in a state where its performance has been reduced by using the expendable supplies of which a term of validity has passed can be prevented beforehand.

21 Claims, 3 Drawing Sheets

INFORMING APPARATUS AND METHOD FOR EXCHANGE TIME OF EXPENDABLE SUPPLIES IN REFRIGERATOR

FIELD OF THE INVENTION

The present invention relates to a refrigerator, and more particularly, to an informing apparatus and method for exchange time of expendable supplies used in the refrigerator.

BACKGROUND OF THE INVENTION

There is a tendency for recent electronic appliances to have various functions. In case of a refrigerator, the functions of automatically making ice and purifying water have in addition to fundamental functions such as refrigeration and freezing. Since the above functions are added thereto, various kinds of expendable supplies are needed. Herein, as an example of the expendable supplies, a filter needed for purifying the water will be specifically described.

FIG. 1 is a constitutional view schematically showing a refrigerator with the filter housed therein, which has the prior functions of purifying the water and making the ice. As shown in this figure, an interior space of the refrigerator is sectioned into a refrigerating chamber 10 and a freezing chamber 20 by a longitudinal barrier BR, and a machine room 30 thereof is formed below the refrigerating chamber 10 and the freezing chamber 20. The refrigerating chamber 10 and the freezing chamber 20 are opened and closed by doors 16, 26.

A first valve 32 for blocking off the water, which is introduced from a water pipe, upon exchange of the filter and a second valve 34 for distributing the purified water to respective parts of the refrigerator are installed into the machine room 30. The first and second valves 32, 34 are solenoid valves and are opened and closed by an attractive force that results from a magnetic field generated when an electric power is applied thereto.

The first valve 32 is connected through a connecting tube D1 to a filter 12 installed in the refrigerating chamber 10. The filter 12 has a function of purifying the water introduced into the refrigerator. The water purified within the filter flows into the second valve 34 through a connecting tube D2. Further, onto a side of the refrigerating chamber 10 is installed a tank 14 in which the water purified within the filter 12 is temporarily stored before it is supplied to a dispenser 22 to be described later.

On the other hand, in the freezing chamber 20 is installed an icemaker 24 which is connected to the second valve 34 through a connecting tube D4.

Furthermore, the dispenser 22 for supplying the purified water to the exterior of the refrigerator is installed in front of the refrigerating chamber 10. The dispenser 22 is connected to the tank 14 of the refrigerating chamber 10 through a connecting tube D5.

In the prior refrigerator constructed as such, the water supplied from a source of supply water outside of the refrigerator is supplied, through the first valve 32, to the filter 12 which in turn, purifies the supplied water. The water purified within the filter 12 is supplied, through the second valve 34, to the tank 14 which stores the supplied water. Then, the water stored in the tank 14 is transferred to the dispenser 22. Otherwise, it is transferred directly to the icemaker 24 and utilized therein.

However, there are some problems in the above conventional refrigerator, as follows:

That is, since the filter 12 is one of the expendable supplies, it should be replaced with a new filter after optimal running time thereof has passed. However, a control portion for informing a user of the perceived running time of the filter has not yet been provided in the conventional refrigerator with the filter housed therein. Therefore, the user should keep an exchange date of the filter in mind and should replace the filter with a new one at that time.

However, it is generally difficult to properly perform replacing the filter. In most cases, the filter is frequently replaced after the exchange time thereof has considerably passed. In a case where the exchange time of the filter has considerably passed as mentioned above, the problem that the contaminated water is provided to the user is produced.

Furthermore, in a case where the exchange time of the filter has considerably passed, flow-passage resistance within the filter is increased and a flow rate of the water supplied to the icemaker or the dispenser is remarkably reduced. Therefore, there is also a problem in that a shape of the ice thus formed is not uniform.

SUMMARY OF THE INVENTION

Therefore, the present invention is conceived to solve the problems of the prior art. An object of the present invention is to provide an apparatus and method for informing a user of exchange time of filters for purifying water.

In order to achieve the above object of the present invention, the present invention provides an informing apparatus for exchange time of expendable supplies in a refrigerator, comprising a screen installed on one side of an outer surface of the refrigerator for displaying data; a control portion for processing the data to be displayed on the screen and performing control relevant to operation of the refrigerator; an input portion for receiving data on the exchange of the expendable supplies which are transmitted to the control portion; and an exchange date setting portion for setting an exchange date of the expendable supplies calculated in the control portion on the basis of the data on the exchange of the expendable supplies, and informing the control portion of the exchange date to be displayed on the screen in due time for replacement of the expendable supplies.

The screen may be provided integrally with an input section in which the data are inputted into the screen by a touch.

The informing apparatus of the present invention may further comprise a communication means for transmitting a signal of the exchange of the expendable supplies generated from the control portion to suppliers of the expendable supplies.

Further, according to another aspect of the present invention, the present invention provides an informing method for exchange time of expendable supplies in a refrigerator, comprising the steps of mounting the expendable supplies into the refrigerator; receiving data on the exchange of the mounted expendable supplies inputted by a user; calculating the next exchange date on the basis of the data on the exchange of the expendable supplies; comparing the calculated exchange date with the present date; and displaying information on the exchange of the expendable supplies onto a screen on a front surface of the refrigerator when the exchange date is consistent with the present date.

The step of displaying information on the exchange of the expendable supplies may further comprise a step of displaying the exchange information onto a main menu window in the morning of the exchange date.

The exchange information may continue to be displayed until the expendable supplies have been replaced.

The exchange information on the expendable supplies may be transmitted to suppliers via an additional communication means while it is displayed onto the screen.

According to the present invention constructed as such, there are advantages in that the exchange time of the expendable supplies used in the refrigerator can be punctually kept and the expendable supplies can be rapidly supplied directly from the supplier.

DETAILED DESCRIPTION FOR PREFERRED EMBODIMENT

Figure 1:
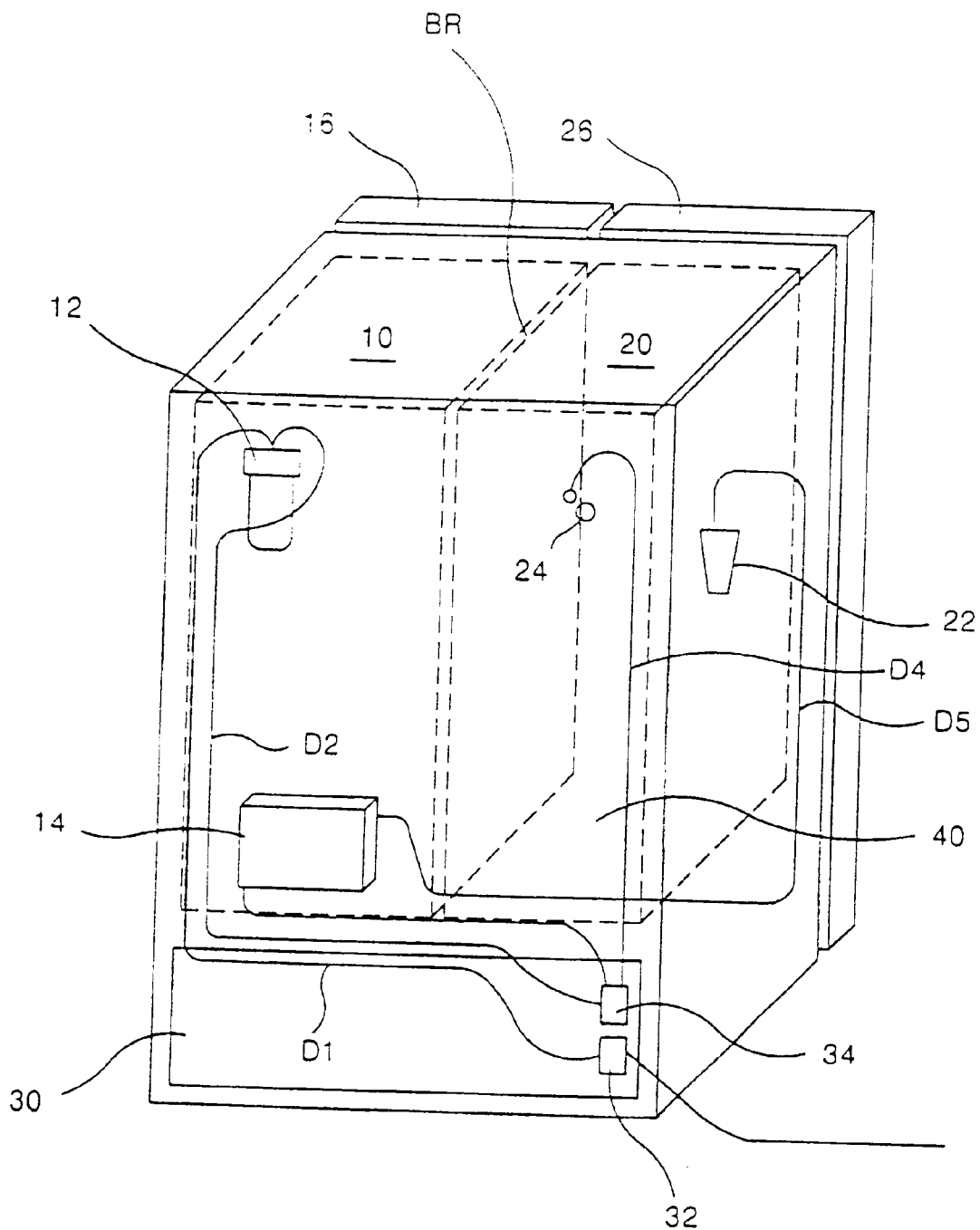
FIG. 1 is a constitutional view schematically showing a refrigerator having a water-purifying device according to the prior art.

Hereinafter, a preferred embodiment of the present invention will be explained in detail with reference to the accompanying drawings. The parts of the present invention identical to those of the prior art are described with like reference numerals designated.

Figure 2:
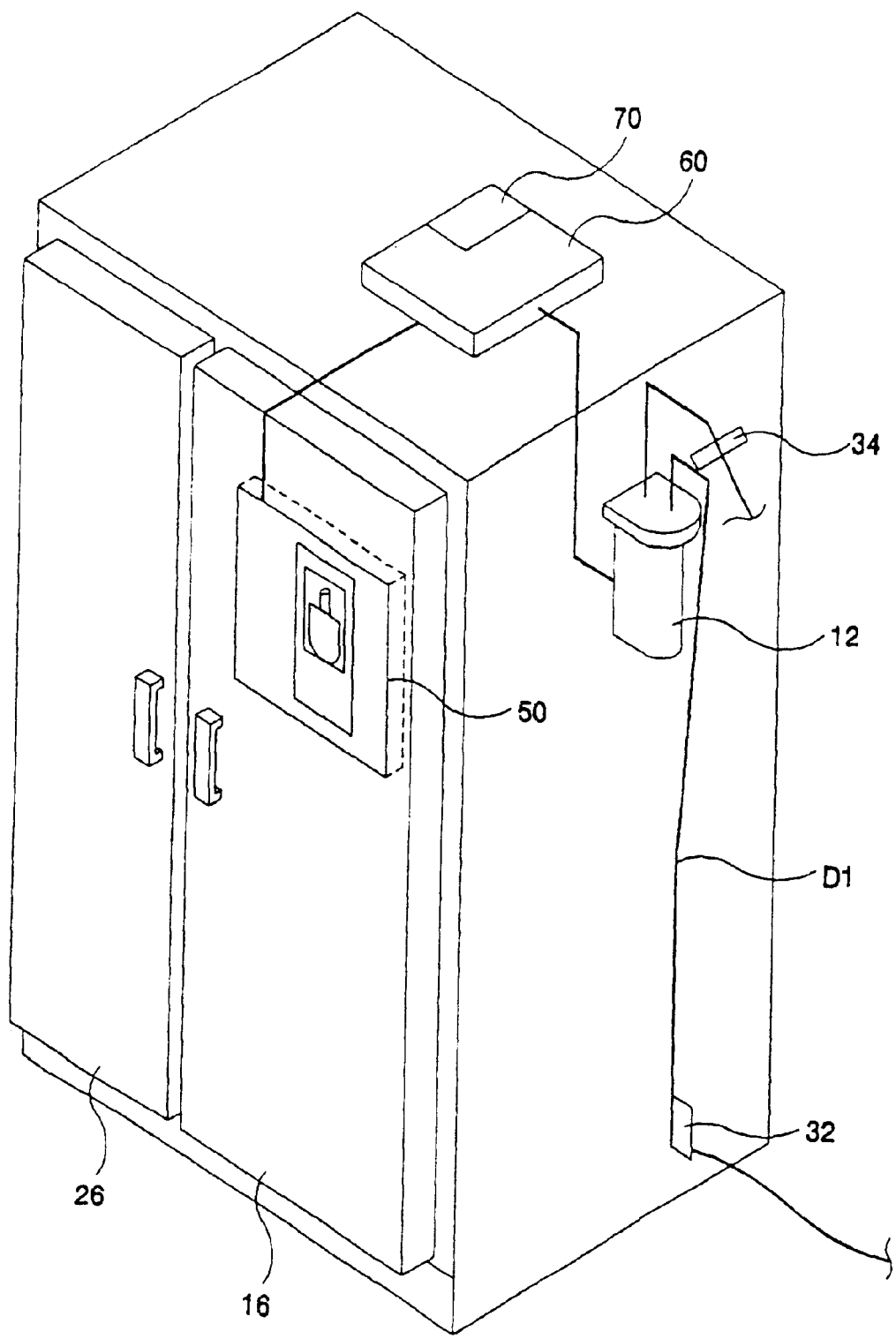
FIG. 2 is a constitutional view showing a preferred embodiment of an apparatus for informing exchange time of expendable supplies of a refrigerator according to the present invention.

As shown in FIG. 2, a touchscreen 50 is installed in a front surface of a door 16 on one side of a refrigerator. Various kinds of data relevant to the operation of the refrigerator are displayed on the touchscreen 50. Such data include, for example, character data, audio data, image data, and video data; and the contents displayed thereon include operating states of the refrigerator, the other necessary information, information relevant to a housekeeper, etc. Of course, a speaker (not shown) for outputting the audio data is integrally provided at one side of the touchscreen.

The touchscreen 50 has a function that necessary information can be inputted into the touchscreen by bringing user's fingers, etc. into contact with a surface thereof. Therefore, an additional input device does not have to be utilized.

On the other hand, the refrigerator is provided with a control portion 60 which controls the operation of the refrigerator, causes data to be displayed onto the touchscreen 50 and processes data inputted from the touchscreen. The control portion 60 is also provided with an exchange date setting portion 70. The exchange date setting portion 70 is a portion for storing the exchange date of the various kinds of expendable supplies, for example, a filter 12. The exchange date setting portion 70 is constructed such that the stored information can be still memorized as it is, although electric power turns off.

The exchange date setting portion 70 may be constructed in the form of a separate database, and it may be provided, if desired, directly in the control portion 60. The exchange date setting portion 70 stores the exchange date of the expendable supplies, which has been calculated on the basis of data on the exchange of the expendable supplies inputted through the touchscreen 50. Further, the setting portion informs the control portion 60 of the calculated exchange date so that the date can be displayed onto the touchscreen 50.

Furthermore, although it is not shown in this figure, a communication means, which is controlled by the control portion 60, is provided so that necessary data can be interchanged through the connection with the internet. Therefore, according to the present invention, delivery of the necessary expendable supplies can be made by transmitting the data on the exchange of the expendable supplies to service centers or the like via the internet.

Figure 3:
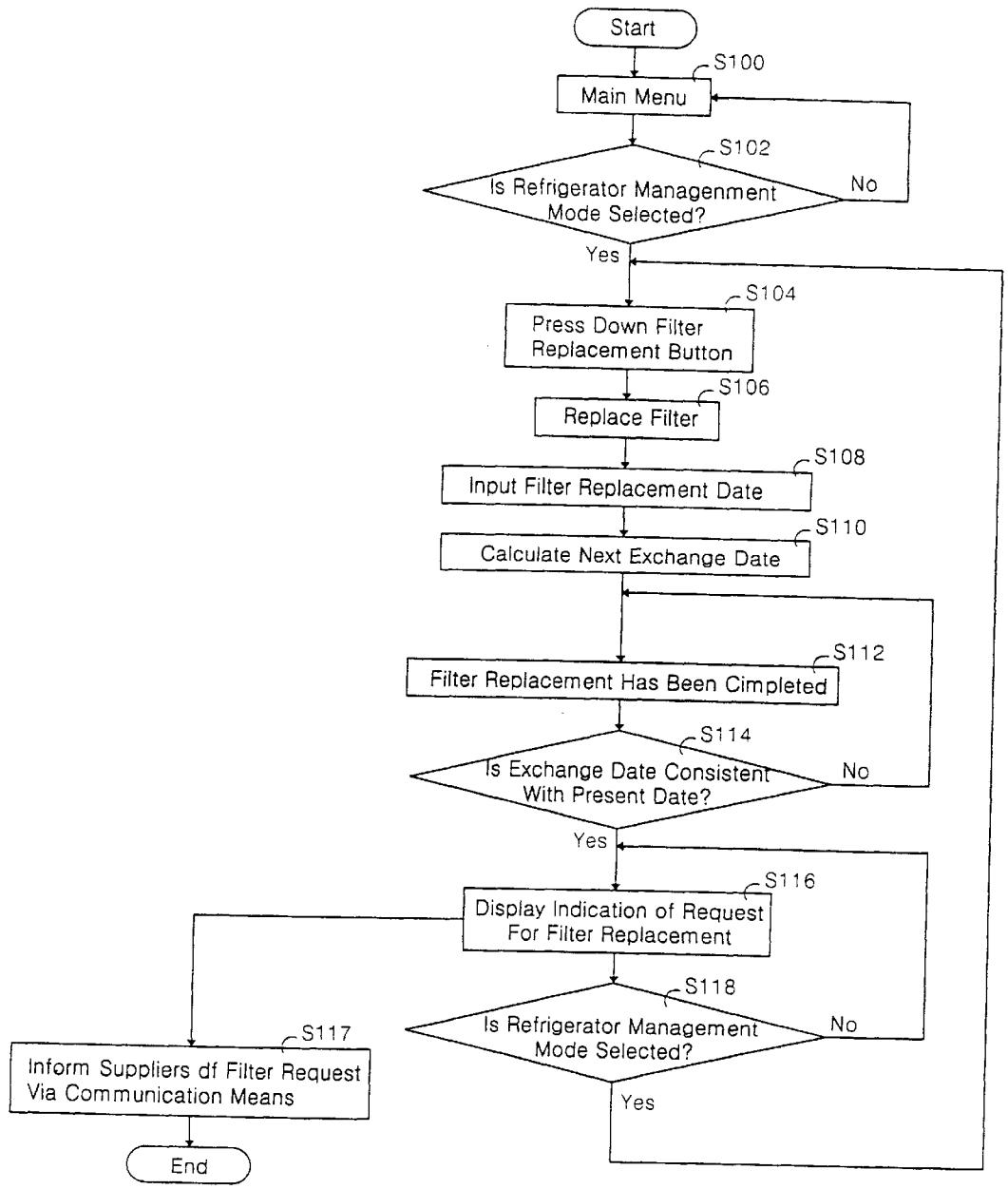
FIG. 3 is a flowchart illustrating the operation procedures of the embodiment of the present invention.

The operation of the present invention constructed as such will be described in detail with reference to FIG. 3.

When the electric power is applied to the refrigerator, the control portion 60 causes a main menu window to be displayed onto the touchscreen 50 (S100). Since there are various kinds of menus relevant to the control of the refrigerator in the main menu window, the user can select a menu according to the user's need and control the operation of the refrigeration.

The filter 12, for example, among the expendable supplies is described herein. In order to replace the filter 12, the procedure should go into a refrigerator management mode. If the refrigerator management mode is selected (S102), a filter replacement button among various kinds of the selectable menus is pressed down (S104) and it goes into a state for the filter replacement (S106).

During the state, the filter 12 is replaced and the data on filter replacement are inputted (S108). Here, there may be several data on the filter replacement. First, the user can directly appoint a date when the filter 12 should be replaced. Further, the user may appoint a term of validity of the filter 12 (for example, 5 months, 6 months, etc.). Furthermore, the user can set an amount of water that has passed through the first valve 32, instead of setting the exchange time of the filter 12 in the form of a date. That is, the amount of water that has passed through the first valve 32 is measured, and the filter 12 will be then replaced with a new one when the amount of water has reached a predetermined value.

After the input of data on the filter exchange has been completed as above, the control portion 60 calculates the next exchange date of the filter (S110) and then stores the calculated date into the exchange date setting portion 70. Subsequently, the operation of the filter replacement is completed by pressing down a filter replacement completion button (S112).

Next, as the refrigerator continues to operate, the control portion 60 periodically compares the exchange date stored into the exchange date setting portion 70 with the present date. Since this comparison operation has been separately programmed in the control portion 60, it can be performed periodically, for example, everyday (S114).

When the exchange date is consistent with the present date during the comparison operation, indication of request for the filter replacement is displayed on the touchscreen 50. The indication of the filter replacement request is displayed on the main menu window in the morning of the exchange date (S116).

Furthermore, while the indication of the filter replacement request is displayed, a request for the filter to the service centers or suppliers is made through an additional communication means. At this time, information on a type of the filter is transmitted thereto together with user-related information.

On the other hand, when the indication of the filter replacement request has been displayed on the touchscreen 50, an additional input of the user is awaited. That is, it is confirmed as to whether there is an input of the user for going into the refrigerator management mode (S118). If there is no input of the user at this stage, the indication of the filter replacement request is continuously displayed.

In addition, when it goes into the refrigerator management mode by the user, it is again returned to step S104 and the replacement operation of the filter 12 is performed. This operation is incessantly and repeatedly performed while the refrigerator operates.

As described specifically in the foregoing, according to the present invention, the exchange date of the expendable supplies is calculated on the basis of the inputted data on the exchange of the expendable supplies and is indicated to the user through the touchscreen on the relevant exchange date. Therefore, it can be prevented that the expendable supplies are carelessly used even after the exchange date thereof has passed.

Accordingly, the filter can always operate in a normal state and a precise amount of the water can be supplied. Therefore, since the amount of the water supplied to the icemaker or the dispenser can always be precisely maintained, making of the poor ice can be prevented beforehand.

Further, there is an advantage in that the expendable supplies can be automatically requested to the service centers via the internet by the additional communication means upon completion of the term of validity of the expendable supplies and can be delivered from the service centers to the user.

It should be understood that a person skilled in the art to which the invention pertains may make various modifications to the present invention within the scope of the present invention defined by the appended claims.

What is claimed is:

1. An informing apparatus for exchange time of expendable supplies in a refrigerator, comprising:
    a screen installed on one side of an outer surface of said refrigerator for displaying data;
    a control portion for processing said data to be displayed on said screen and performing control relevant to operation of said refrigerator;
    an input portion for receiving data on the exchange of said expendable supplies which are transmitted to said control portion;
    an exchange date setting portion for setting an exchange date of said expendable supplies calculated in said control portion on the basis of said data on the exchange of said expendable supplies, and informing said control portion of said exchange date to be displayed on said screen in due time for exchange of said expendable supplies; and
    a communication means for transmitting a signal of said exchange of said expendable supplies generated from said control portion to suppliers of said expendable supplies.

2. The informing apparatus as claimed in claim 1, wherein said screen is provided integrally with an input section in which the data are inputted into said screen by touch.

3. The informing apparatus as claimed in claim 1, wherein the control portion receives data on the exchange of expendable supplies from a user via the input portion.

4. The informing apparatus as claimed in claim 1, wherein a proposed exchange date for expendable supplies is provided to a user by the control portion.

5. The informing apparatus as claimed in claim 1, wherein the exchange date is calculated based on elapsed operation time.

6. The informing apparatus as claimed in claim 1, wherein the exchange date is input as an end of operation date.

7. The informing apparatus as claimed in claim 1, wherein the communication means is configured to communicate ordering information for expendable supplies to suppliers of said expendable supplies.

8. The informing apparatus as claimed in claim 1, wherein the expendable supplies comprise at least a water purification filter.

9. The informing apparatus as claimed in claim 8, wherein the exchange date is calculated based on volume of water purified.

10. The informing apparatus as claimed in claim 8, wherein the exchange date is calculated based on change in flow rate through the water filter.

11. The informing apparatus as claimed in claim 8, wherein the exchange date is calculated based on contamination level in the purified water.

12. An informing method for exchange time of expendable supplies in a refrigerator, comprising:
    receiving data input by a user on the exchange of said expendable supplies mounted into said refrigerator by the user;
    transmitting said data on the exchange of said expendable supplies to a control portion of said refrigerator;
    calculating the next exchange date on the basis of said data on the exchange of said expendable supplies in said control portion;
    comparing said calculated exchange date with the present date in said control portion;
    displaying information on the exchange of said expendable supplies onto a screen on a front surface of said refrigerator when said control portion determines said exchange date is consistent with the present date; and
    transmitting said exchange information on said expendable supplies to suppliers via an additional communication means while it is displayed onto said screen.

13. The informing method as claimed in claim 12, wherein said step of displaying information on the exchange of said expendable supplies further comprises a step of displaying said exchange information onto a main menu window in the morning of said exchange date.

14. The informing method as claimed in claim 13, wherein said exchange information continues to be displayed until said expendable supplies have been replaced.

15. The informing method as claimed in claim 12, wherein the k step of receiving data on the exchange of said expendable supplies inputted by a user comprises:
    providing a proposed term of validity for the expendable supplies based on preset value(s); and
    selecting the proposed term of validity of expendable supplies.

16. The informing method as claimed in claim 15, wherein the term of validity of expendable supplies is measured in elapsed operation time.

17. The informing method as claimed in claim 15, wherein the term of validity of expendable supplies is expressed as an end of operation date.

18. The informing method as claimed in claim 15, wherein the expendable supplies comprise at least a water purification filter.

19. The informing method as claimed in claim 18, wherein the term of validity of the water filter is measured in volume of water purified.

20. An informing apparatus for exchange time of expendable supplies in a refrigerator, comprising:

a control portion configured to perform control of said refrigerator, the control portion calculating an exchange date of said expendable supplies based on a term of validity of said expendable supplies input by a user, and comparing said calculated exchange date with the present date; and a communication means configured to transmit a signal of said exchange of said expendable supplies generated from said control portion to suppliers of said expendable supplies.

21. An informing method for exchange time of expendable supplies in a refrigerator, comprising:

receiving a term of validity input by a user of said expendable supplies mounted into said refrigerator by the user;

calculating an exchange date for said expendable supplies based on said term of validity of said expendable supplies;

comparing said calculated exchange date with the present date; and transmitting said exchange information on said expendable supplies to suppliers.

* * * * *